United States Patent [19]

Yamamoto

[11] Patent Number: 4,870,636
[45] Date of Patent: Sep. 26, 1989

[54] OPTICAL INFORMATION PROCESSING APPARATUS AND CLEANING CARTRIDGE

[75] Inventor: Hiroshi Yamamoto, Yokohama, Japan

[73] Assignee: Kabushiki Kaisha Toshiba, Kawasaki, Japan

[21] Appl. No.: 172,410

[22] Filed: Mar. 24, 1988

[30] Foreign Application Priority Data

Mar. 25, 1987 [JP] Japan .................................. 62-70771
Jul. 27, 1987 [JP] Japan ................................ 62-186993
Jul. 27, 1987 [JP] Japan ................................ 62-186994

[51] Int. Cl.⁴ .......................... G11B 7/12; G11B 5/41; G11B 23/02
[52] U.S. Cl. .................................. 369/292; 369/71; 15/DIG. 12; 360/128
[58] Field of Search ................... 369/71, 292; 360/128; 15/DIG. 12

[56] References Cited

U.S. PATENT DOCUMENTS

| | | | |
|---|---|---|---|
| 4,106,057 | 8/1978 | Vroenhoven | 369/71 |
| 4,384,311 | 5/1983 | McNeil | 360/128 |
| 4,503,473 | 3/1985 | Eyler et al. | 360/128 |
| 4,663,686 | 5/1987 | Freeman et al. | 360/128 |
| 4,682,257 | 7/1987 | Newman | 360/128 |

FOREIGN PATENT DOCUMENTS

237236  10/1986  Japan .................................. 369/71

Primary Examiner—Steven L. Stephan
Attorney, Agent, or Firm—Finnegan, Henderson, Farabow, Garrett, & Dunner

[57] ABSTRACT

An optical information processing apparatus includes a loading section in which a disk cartridge enclosing an information recording medium therein and a cleaning cartridge enclosing a cleaning member are selectively loaded. When the cleaning cartridge is loaded in the apparatus, the cleaning member contacts the objective of an optical head of the apparatus. In response to a detection signal from a sensor for detecting that the cleaning cartridge is loaded in the loading section, a drive mechanism of the apparatus moves the optical head and cleaning member relative to each other while keeping the objective and cleaning member in sliding contact.

15 Claims, 11 Drawing Sheets

OPTICAL INFORMATION PROCESSING APPARATUS AND CLEANING CARTRIDGE

BACKGROUND OF THE INVENTION

1. Field of the Invention

The present invention relates to an optical information processing apparatus in which a cartridge for housing an information storing medium can be loaded and which records information on and reads information from the information storing medium. The present invention also relates to a cleaning cartridge for cleaning optical means of the information processing apparatus.

2. Description of the Related Art

When the objective at the optical head is to be cleaned in the case of a conventional optical information processing apparatus such as an optical disk apparatus, the device is dismantled to expose the objective outside and the objective thus exposed is then manually cleaned by using a cleaning member such as the brush. After this cleaning, the device is assembled again.

When the above cleaning manner is employed, however, the cleaning work is extremely troublesome and takes a long time. In addition, a special technique is needed to dismantle and assemble the device and only those who has such technique are allowed to do the cleaning work.

SUMMARY OF THE INVENTION

The present invention is intended to eliminate the above-mentioned drawbacks and its object is to provide an optical information processing apparatus and a cleaning cartridge for enabling anybody to easily and reliably clean the surface of optical means.

In order to achieve the above object, an optical information processing apparatus according to the invention comprises a housing having an inlet opening and a loading section a first cartridge for housing an information storing medium; a loading means for removably loading the first cartridge in the loading section of the housing; optical means for processing information from the information storing medium of the first cartridge loaded in the loading section; a second cartridge capable of being loaded in the loading section instead of the first cartridge and having a cleaning means for contacting and cleaning the optical means, when the second cartridge is loaded in the loading section; means for detecting that the second cartridge is loaded in the loading section; and drive means for, moving the optical means and the cleaning member relative to each other and for keeping the optical means and the cleaning means in contact.

According to the present invention, there is further provided a cleaning cartridge for cleaning optical means movable in first and second directions in a movement path of an information processing apparatus and capable of reproducing information from an optical memory. The cleaning cartridge comprises a cartridge body removable loadable in the processing apparatus and cleaning means provided in the cartridge for contactably cleaning the optical means when the cartridge body is loaded.

BRIEF DESCRIPTION OF THE DRAWINGS

FIGS. 1 through 14 show an optical information processing apparatus according to an embodiment of the present invention, in which

FIGS. 15 through 20 show a modification of the cleaning cartridge, in which

DETAILED DESCRIPTION OF THE PREFERRED EMBODIMENT

An embodiment of the present invention will be described with reference to the accompanying drawings.

Figure 1:
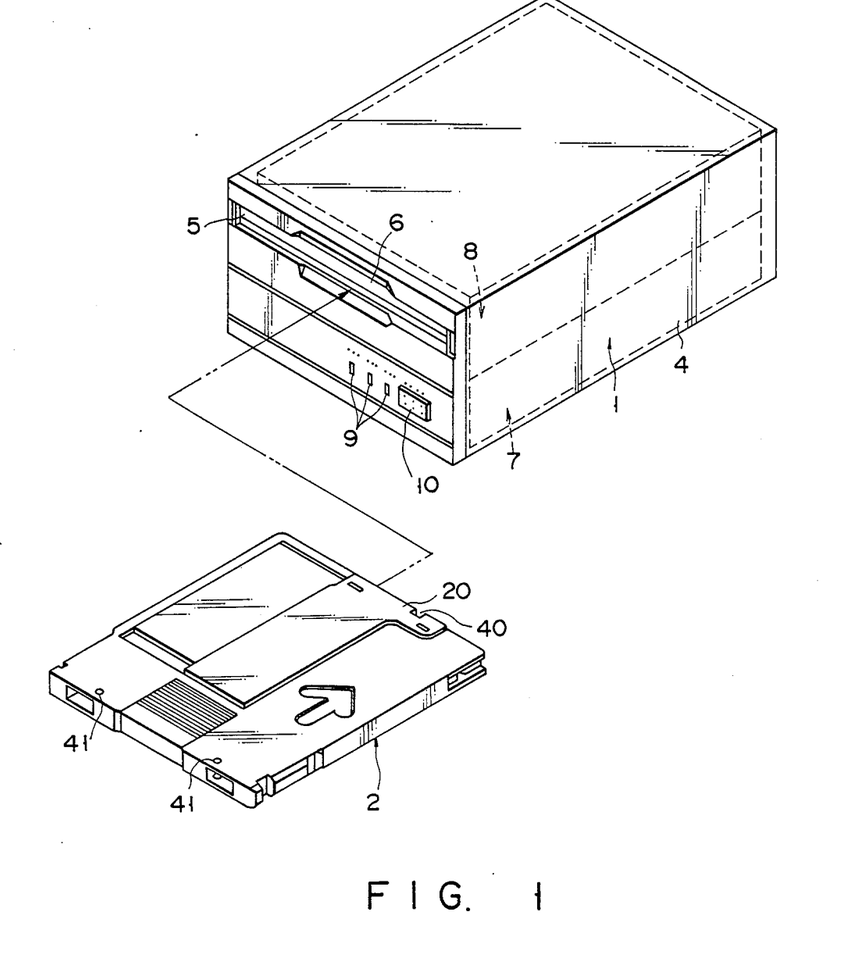
FIG. 1 is a perspective view showing the device and a cleaning cartridge.
Figure 2:
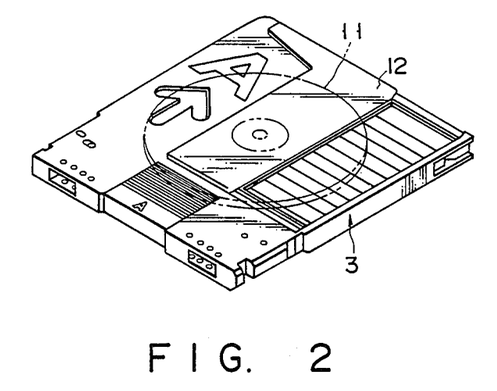
FIG. 2 is a perspective view showing a disk cartridge.

FIG. 1 shows the appearance of optical disk apparatus 1 as an optical information processing apparatus and cleaning cartridge 2 (second cartridge) which is to be loaded in apparatus 1, and FIG. 2 shows the appearance of disk cartridge 3 (first cartridge) standardized to be 5.25 inches, for example, and used in optical disk apparatus 1.

Figure 14:
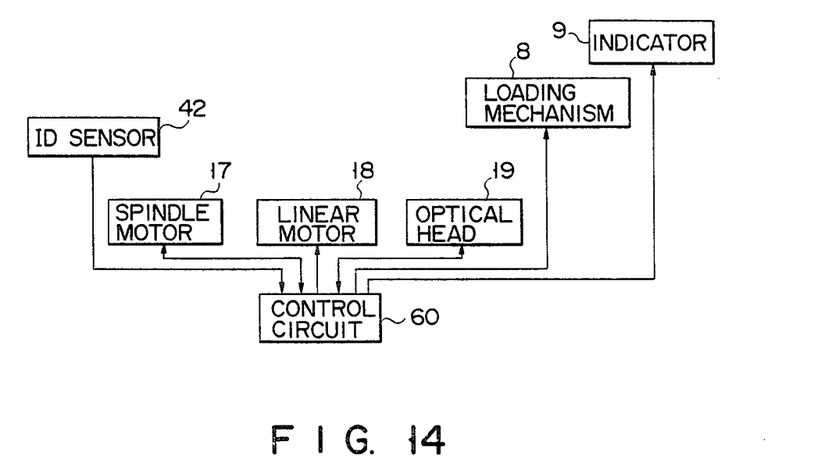
FIG. 14 is a block diagram showing a control circuit of the apparatus.

Optical disk apparatus 1 includes casing 4, and the upper front of the casing is formed with inlet opening 6 through which a cartridge is inserted into and ejected from the casing. Opening 6 is opened and closed by shutter 5. In casing 4 are provided drive base mechanism 7, loading mechanism 8, control circuit 60 (see FIG. 14) which has a microcomputer and the like for controlling the operation of mechanisms 7 and 8, and the like. Indicators 9 and cartridge ejecting switch 10 are provided at the lower front of casing 4.

As is shown in FIG. 2, disk cartridge 3 houses therein optical disk 11 as an information storing medium. Both faces A and B of disk 11 can be used for storing information. Cartridge 3 includes a window (not shown) for exposing a part of disk 11, and slidable shutter 12 for opening and closing the window.

Figure 3:
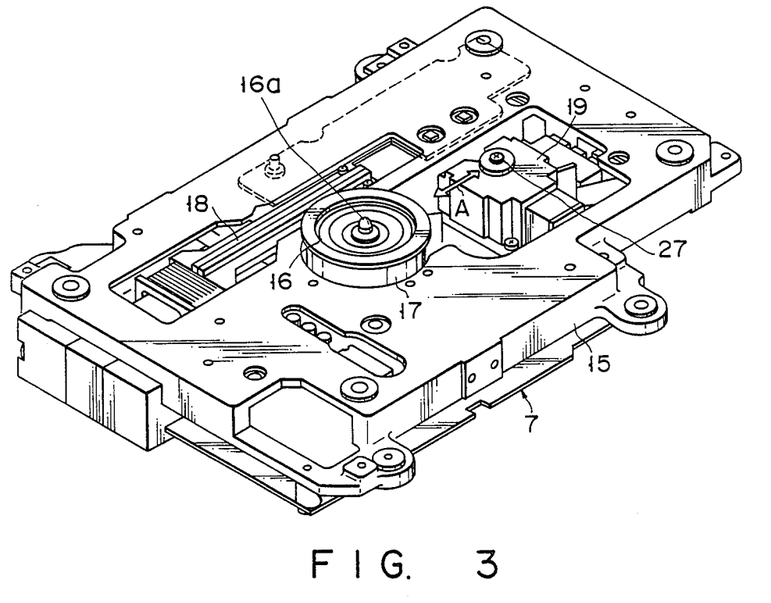
FIG. 3 is a perspective view showing a drive mechanism of the apparatus.

As is shown in FIG. 3, drive base mechanism 7 has disk base 15, on which are mounted spindle motor 17, linear motor 18, optical head 19 serving as the optical means, and the like. Motor 17 is provided with turntable 16 for holding and rotating disk 11. Head 19 is moved in the radial direction (or direction shown by an arrow A) of disk 11 by linear motor 18, and records information on and reads information from an information storing layer on the bottom side of disk 11. Pin 16a projects from the center of turntable 16.

Loading mechanism 8 includes three main components such as a cartridge holder for holding disk cartridge 3 and provided with means for opening and closing shutter 12, a cam member for moving the cartridge holder to a predetermined position, and a guide member for guiding the cam member and the cartridge holder and having a cam member driving means. Loading mechanism 8 may have the same construction as the one disclosed in, e.g., Japanese Patent Application No. 61/137480.

Figure 4:
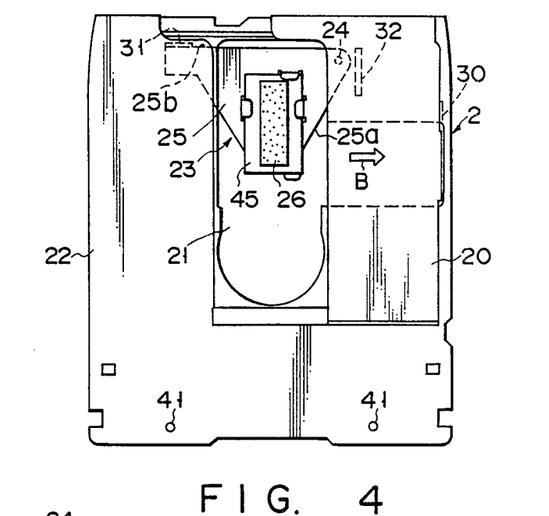
FIGS. 4 through 6 are plane views showing different operating states of the cleaning cartridge.
Figure 5:
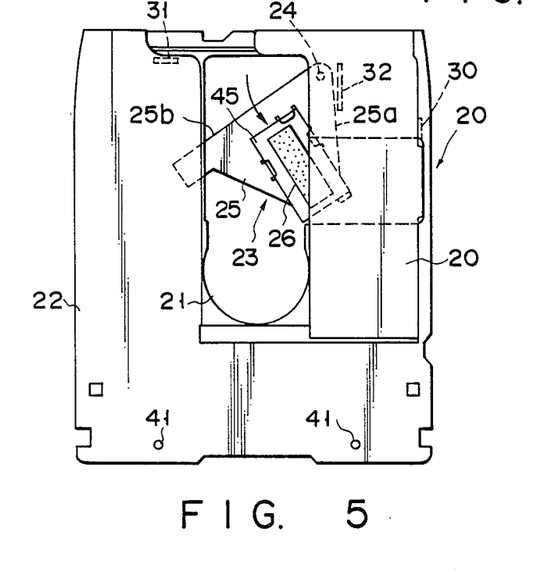
Figures 6, 7, 8:
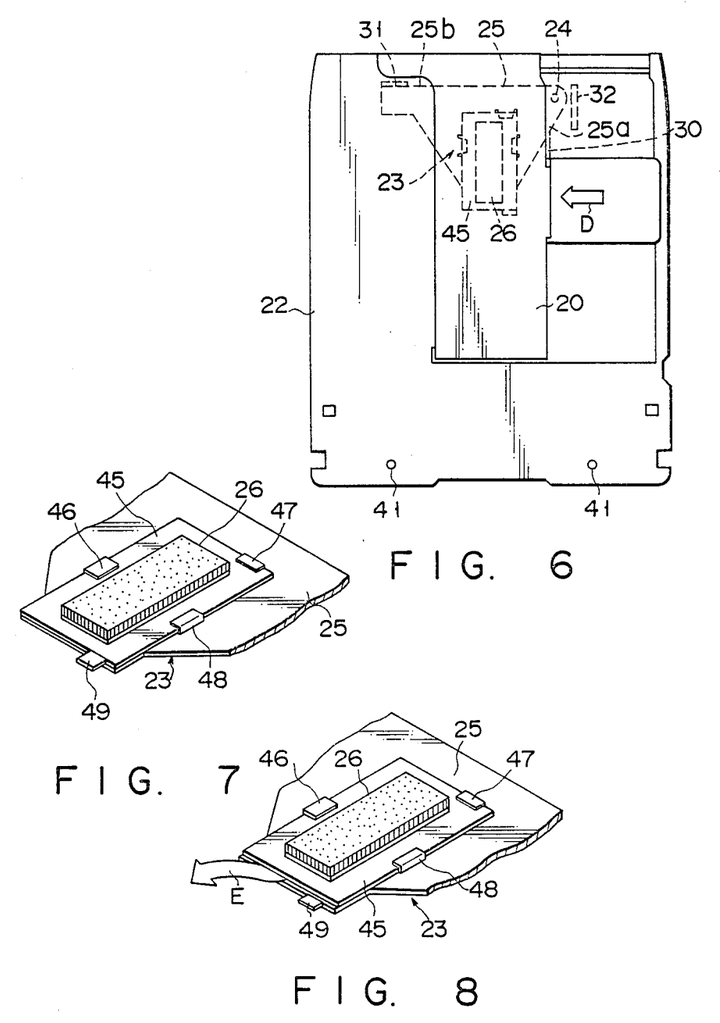
FIGS. 7 and 8 are perspective views showing the cleaning member in a fixed state and a removable state, respectively.

Like the above-mentioned standardized cartridge 3, cleaning cartridge 2 is constructed so as to be capable of being inserted into disk apparatus 1 through opening 6. More specifically, cleaning cartridge 2 has substantially same size and shape as those of disk cartridge 3. Cartridge 3 includes cartridge body 22 formed with opening 21 which is opened and closed by shutter 20, and cleaning unit 23 housed in cartridge body 22, as is shown in FIGS. 4 through 6. FIGS. 4 through 6 show cartridge 2 topside down. When cartridge 2 is used, it is loaded in disk apparatus 1 topside up.

Cleaning unit 23 includes triangular movable base 25 swingably attached to cartridge body 22 by means of pin 24, and cleaning member 26 mounted on the upper surface of base 25 (the bottom surface of base 25 when cleaning cartridge 2 is inserted into optical disk apparatus 1) through support plate 45. When cartridge 2 is loaded in apparatus 1, cleaning member 26 is exposed through opening 21 of cartridge body 22 and contacts objective 27 of optical head 19.

The swinging of movable base 25 is defined, as will be described later, by first stopper 30 attached to shutter 20 and by second and third stoppers 31 and 32 located in cartridge body 22.

When shutter 20 is moved in a direction shown by an arrow B and opening 21 is opened, as is shown in FIG. 4, first stopper 30 of shutter 20 is kept remote from end face 25a of movable base 25. In this condition, base 25 can swing between an original position where its end face 25b contacts second stopper 31 as is shown in FIG. 4 and a swing position where end face 25a contacts third stopper 32 as is shown in FIG. 5.

When shutter 20 is moved in a direction shown by an arrow D, leaving opening 21 closed, as is shown in FIG. 6, first stopper 30 contacts end face 25a of base 25 while second stopper 31 contacts end face 25b of base 25. Therefore, base 25 is kept at its original position and cannot swing accordingly.

When shutter 20 is closed after base 25 swings toward its swing position, the base is pushed at end face 25a by first stopper 30 and certainly returned to its original position, as is shown in FIG. 6.

Cartridge body 22 is provided with ID holes 41 which serve as detecting elements for showing that the cartridge which has been loaded in processing apparatus 1 is cleaning cartridge 2. When cartridge 2 is loaded in apparatus 1, ID holes 41 are optically detected by ID sensors 42 (shown in FIG. 10) of apparatus 1.

As is shown in FIG. 1, shutter 20 is provided with recess 40 for opening and closing shutter 20, as in disk cartridge 3. Every time when cartridge 2 is inserted into apparatus 1, therefore, shutter 20 is automatically opened and closed.

Figure 9:
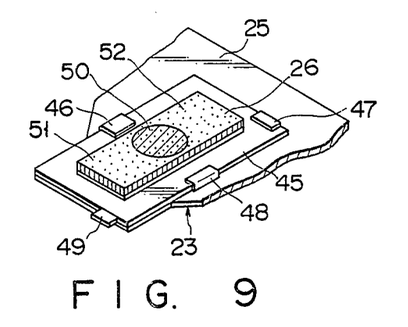
FIG. 9 is a perspective view showing the cleaning member on which a cleaning liquid coated.

Cleaning member 26 is fixed on rectangular support plate 45 by a double-adhesive tape (not shown), as is shown in FIGS. 7 through 9. Support plate 45 is mounted on movable base 25 in such a way that its three sides are held by L-shaped holding claws 46, 47 and 48 which are tongue pieces erected from movable base 25, and that its remaining one side is held by stopper claw 49. Support plate 45 is made of resin and can be resiliently deformed. It can be therefore detached from movable base 25 in such a way that it is pulled in a direction shown by an arrow E while keeping its one end warped and separated from stopper claw 49, as is shown in FIG. 8. When support plate 45 is treated reversely, it can be attached to movable base 25.

Cleaning member 26 is a rectangular brush made of soft fibers such as nylon fibers, and it is attached to movable base 25 so that its longitudinal sides are along those of opening 21 of cartridge body 22 or along the moving direction of optical head 19 while base 25 is at the original position shown in FIGS. 4 and 6.

As is shown in FIG. 9, cleaning member 26 has cleaning-liquid-immersed portion 50 in the center thereof. Member 26 includes therefore dry portion 51 on one side thereof, humid portion 50 in the center thereof, and another dry portion 52 on the other side thereof when it is viewed in the longitudinal direction thereof.

Control circuit 60 (FIG. 14) controls operations of loading mechanism 8, indicators 9, spindle motor 17, linear motor 18, optical head 19 and the like, and receives detection signal from ID sensors 42. When cleaning cartridge 2 is loaded in apparatus 1 and ID holes 41 of cartridge 2 are detected by ID sensors 42, control circuit 60 drives linear motor 18, as will be described later, and switches indicators 9 on to show that apparatus 1 is under cleaning.

It will be described how objective 27 of device 1 is cleaned by cleaning cartridge 2.

Shutter 20 of cleaning cartridge 2 is previously opened to check the cleaning liquid coated on cleaning member 26. When cleaning member 26 is too dry, a proper amount of a cleaning liquid is coated on cleaning member 26 in the center thereof and shutter 20 is then closed. When shutter 20 is closed, movable base 25 integral with cleaning member 26 is set at the original position, as is shown in FIG. 6.

Thereafter, cleaning cartridge 2 is inserted into optical disk apparatus 1 through inlet opening 6.

Figure 10:
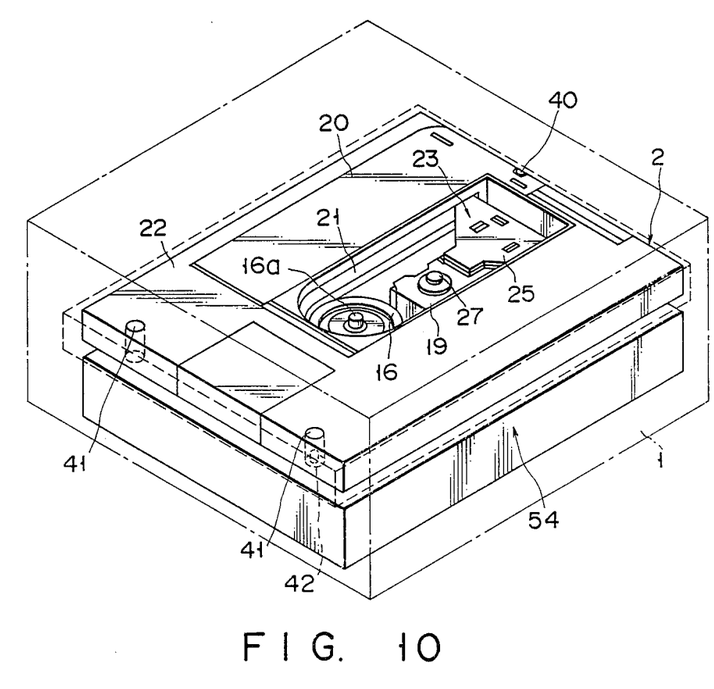
FIGS. 10 through 12 are perspective, side and plane views showing the device in which the cleaning cartridge is loaded.
Figures 11, 12:
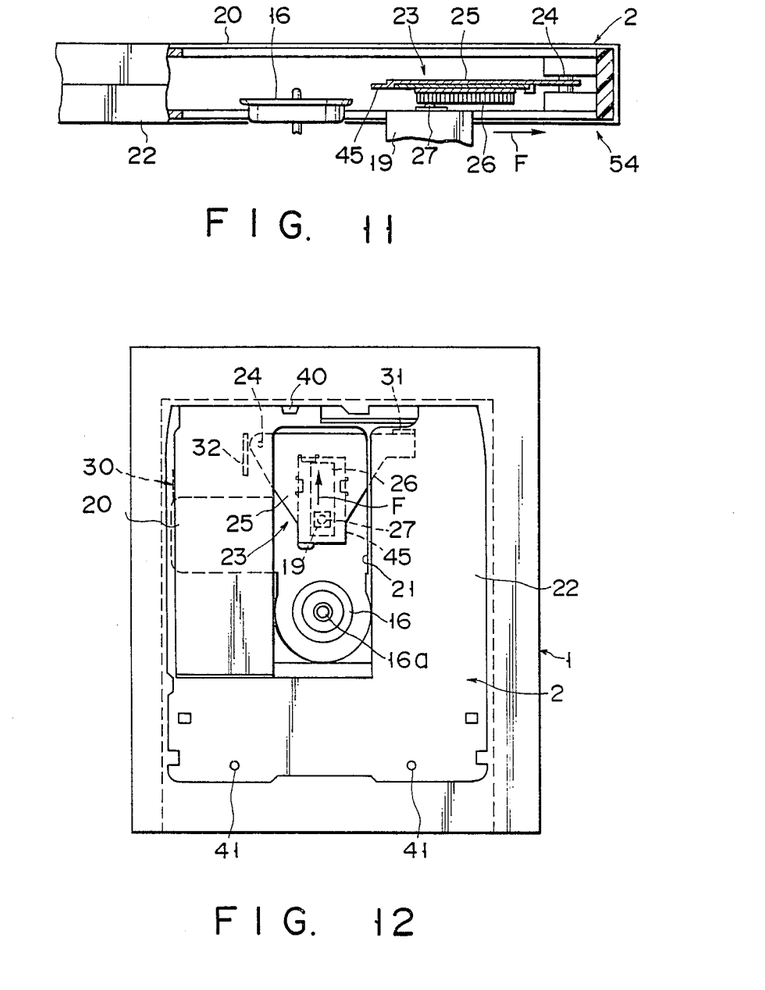

Cleaning cartridge 2 inserted is taken into apparatus 1 by loading mechanism 8 and shutter 20 is then opened. Thus, as is shown in FIGS. 10 and 11, cartridge 2 is loaded in loading portion 54. In recording and reproducing operations, disk cartridge 3 is also loaded in loading portion 54.

When shutter 20 is opened, first stopper 30 integral with shutter 20 is separated from end face 25a of movable base 25, but movable base 25 is kept at its original position because no rotating force is added to movable base 25. In accordance with the loading of cartridge 2, cleaning member 26 contacts objective 27 at its dry portion 51.

When ID sensors 42 of apparatus 1 detect ID holes 41 of cleaning cartridge 2, detection signal is applied to control circuit 60. Responsive to the detection signal, control circuit 60 turns indicators 9 on so as to indicate that the cleaning of objective 27 is started. Further, control circuit 60 drives linear motor 18 of drive base mechanism 7 to move optical head 19 in a direction shown by arrow F in FIGS. 11 and 12, that is, in a forward direction in which optical head 19 departs from turntable 16. This movement of optical head 19 enables objective 27 and cleaning member 26 to be moved relative to each other, while keeping them in sliding contact.

In this case, objective 27 moves with sliding on dry portion 51 on one side of cleaning member 26, then cleaning-liquid-immersed portion 50 in the center thereof, and dry portion 52 on the other side thereof. This enables those dirts on the objective which cannot be cleaned by rubbing only to be removed by the cleaning liquid. In addition, objective 27 can be wiped not to leave the cleaning liquid thereon.

In the above described forward movement of optical head 19, movable base 25 receives with rotational force in the counter clockwise direction round rod 24 in FIG. 12, due to the sliding contact between objective 27 and cleaning member 26. However, movable base 25 does not swing since it abuts against stopper 31. As a result, objective 27 can sufficiently contact cleaning member 26 from its one end side to the other end side, thereby performing reliable cleaning operation.

Figure 13:
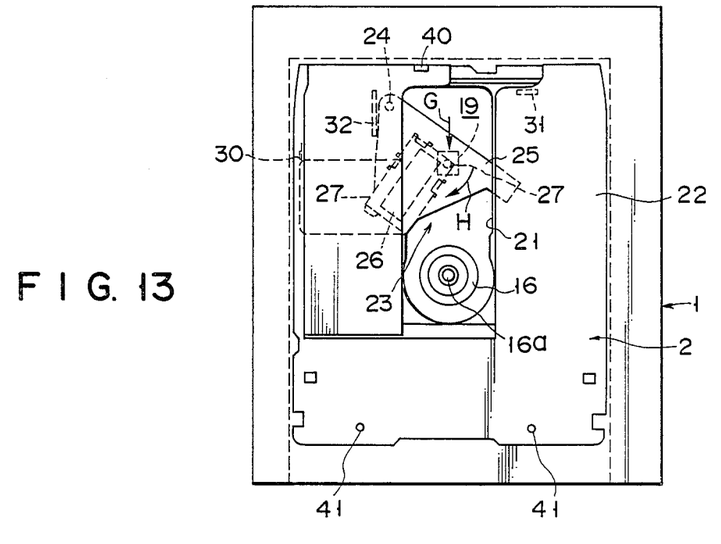
FIG. 13 is a plane view corresponding to FIG. 12 and showing the cleaning unit in a different operating state.

When optical head 19 comes the remotest from turntable 16, control circuit 60 causes optical head 19 to move in a direction shown by arrow G in FIG. 13 or in a backward direction in which optical head 19 moves toward turntable 16.

In this backward movement of optical head 19, movable base 25 receives with rotational force in a clockwise direction shown by arrow H in FIG. 13, due to the sliding contact between objective 27 and cleaning member 26, so that movable base 25 swings round rod 24. Therefore, objective 27 contacts dry portion 52 of cleaning member 26, but does not cleaning-liquid-immersed portion 50 and dry portion 51 thereof on which dirts remain. It will not happen therefore that the dirts again attach to objective 27.

When optical head 19 returns the nearest to turntable 16, control circuit 60 stops the backward movement of optical head 19 and the operation of indicators 9. Thus, it can be confirmed outside apparatus 1 that the cleaning of objective 27 is finished. The cleaning of objective 27 can be achieved through the above-described processes. Cleaning member 26 which has become dirty is detached from movable base 25 and washed, or it is exchanged with a new one.

As apparent from the above, in this embodiment, linear motor 18 of apparatus 1 is used as drive means for moving lens 27 and cleaning member 26 relative to each other.

According to optical disk apparatus 1 having the above described construction, the cleaning of objective 27 can be achieved only by inserting cleaning cartridge 2 into apparatus 1. Thus, it is unnecessary to make the conventional troublesome work of dismantling apparatus 1 and manually cleaning the lens. Therefore, anybody can clean the lens easily and reliably.

Figure 15:
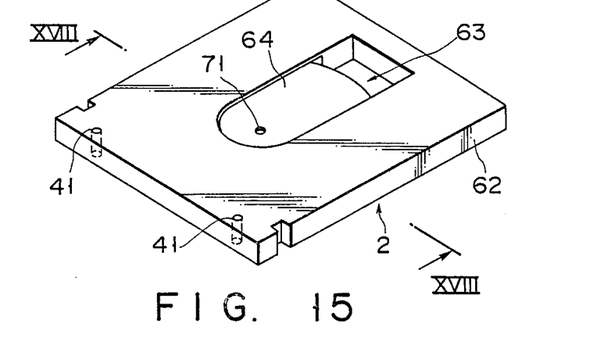
FIGS. 15 through 17 are perspective, plane and sectional views showing the cartridge.
Figure 16:
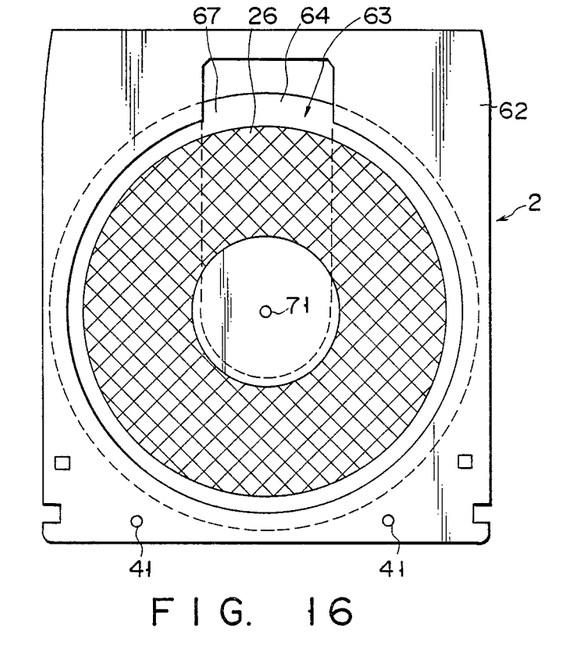

FIGS. 15 through 20 show a modification of cleaning cartridge 2. As in the above embodiment, cleaning cartridge 2 can be taken in optical disk apparatus 1 through inlet opening 6. FIG. 16 shows cartridge 2 topside down and it will be turned topside up when it is to be taken into apparatus 1.

Figure 17:
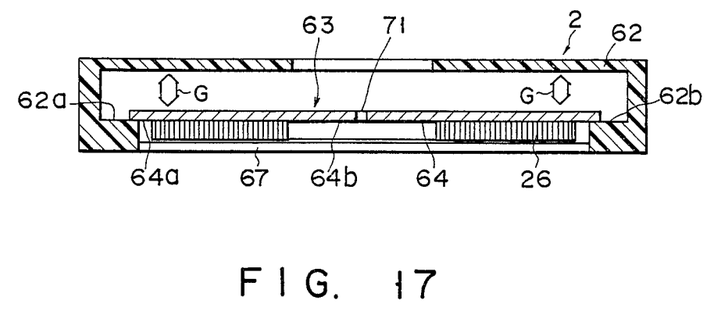

Cartridge 2 includes cartridge body 62 substantially same in size and shape as those of disk cartridge 3, and cleaning unit 63 housed in body 62. Cleaning unit 63 has disk base 64 rotatable in relation to cartridge body 62, and ring-shaped cleaning member 26 attached to one side of base 64 (or bottom of base 64 when cleaning cartridge 2 is loaded into apparatus 1). Cleaning member 26 is made of the same material as that of the above embodiment and it is coaxially fixed to base 64 by fixing means such as a double-adhesive tape (not shown).

Circular opening 67 is formed in the bottom of cartridge body 62. The diameter of opening 67 is smaller than that of base 64 but larger than the outer diameter of cleaning member 26. The lower portion of cleaning member 26 can be thus exposed through opening 67 and contact objective 27. A pair of ID holes 41 which serve as detected elements are provided on one side of cartridge body 62 and are detected by ID sensors 42 of apparatus 1, which sensors generate a detection signal for rotating motor 17 or turntable 16.

As is shown in FIG. 17, cleaning unit 63 can be shifted in those directions shown by arrows G when cleaning cartridge 2 is not loaded in apparatus 1. However, since the diameter of opening 67 is smaller than that of base 64, the shifting of cleaning unit 63 is defined by stepped portions 62a and 62b of cartridge body 62. In other words, edge portion 64a of base 64 abuts against stepped portions 62a and 62b, thereby preventing cleaning unit 63 from coming out of cartridge body 62.

Figure 18:
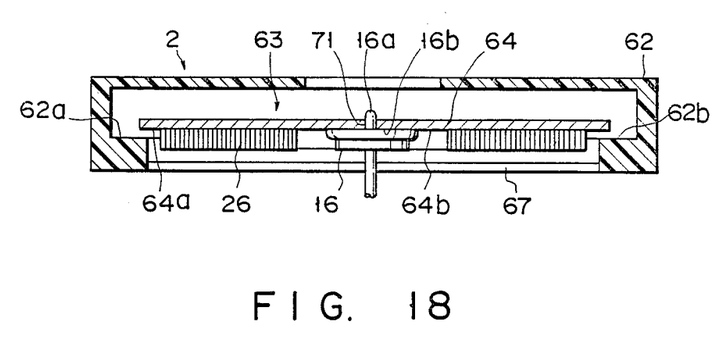
FIGS. 18 through 20 are a sectional view taken along a line XVIII — XVIII in FIG. 15, a perspective view, and a sectional view taken along a line XX — XX in FIG. 19, showing the cartridge loaded in the apparatus, respectively.

Base 64 is provided at its center with hole 71 into which pin 16a of turntable 16 can be fitted. When cleaning cartridge 2 is loaded in optical disk apparatus 1, pin 16a is fitted into hole 71 and support surface 16b of turntable 16 contacts bottom face 64b of base 64, as is shown in FIG. 18. At this time, since stepped portions 62a and 62b are separated from edge portion 64a of base 64, cleaning unit 63 can rotate integral with turntable 16.

Figure 19:
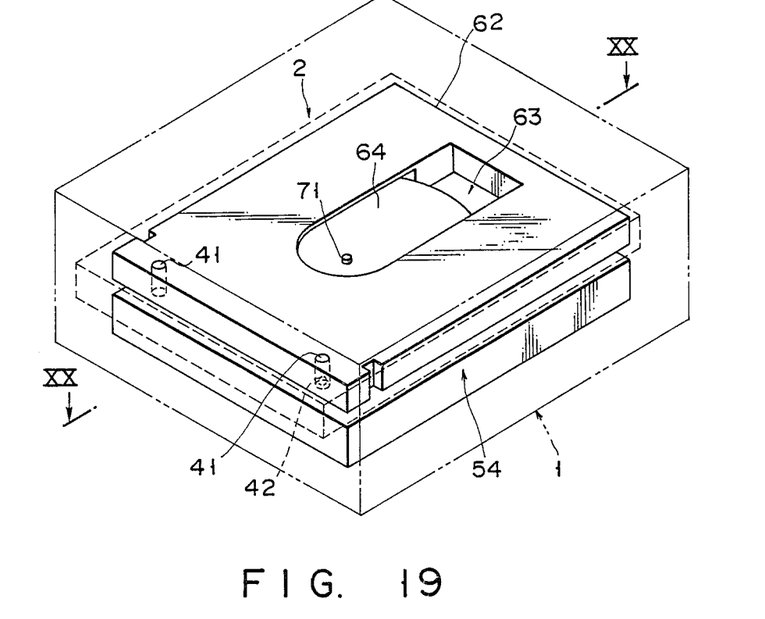
Figure 20:
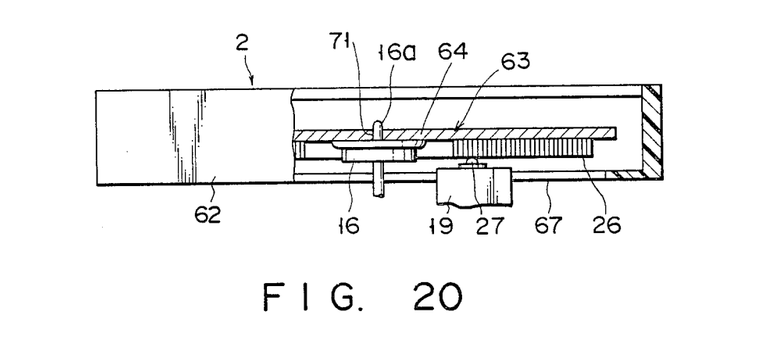

It will be described how objective 27 is cleaned by cleaning cartridge 2. Cartridge 2 is inserted into apparatus 1 through inlet opening 6. As is shown in FIG. 19, it is thus taken into the apparatus by loading mechanism 8 and loaded in loading section 54, like standardized cartridge 3. At this stage, since cartridge 2 is lowered relative to turntable 16, pin 16a of turntable 16 is fitted into hole 71 of cleaning unit 63 and cleaning unit 63 is lifted by turntable 16, as is shown in FIG. 20. Objective 27 contacts cleaning member 26 at the same time.

When ID holes 41 are detected by ID sensors 42 of device 1, signals for rotating motor 17 are output from control circuit 60 while indicators 9 operate to show that the cleaning operation is started. Motor 17 is rotated by a certain angle and turntable 16 is thus rotated together with cleaning unit 63.

When cleaning unit 63 is rotated, objective 27 and cleaning member 26 are moved relative to each other, keeping them in sliding contact. Dirty matters on the surface of objective 27 can be thus removed. After cleaning unit 63 is rotated by the certain angle, control circuit 60 stops the rotation of motor 17 and the flickering of indicators 9 to indicate that the cleaning operation is finished. As apparent from the above in this modification, spindle motor 17 of apparatus 1 is used as drive means for driving cleaning member 26 and objective 27 relative to each other. The objective can be thus easily and reliably cleaned by cleaning cartridge 2, as seen in the above embodiment.

In the above modification, objective 27 and cleaning member 26 are moved relative to each other only by the rotation of cleaning unit 63. However, it may be arranged that cleaning unit 63 is rotated while optical head 19 is reciprocated by linear motor 18. Namely, spindle motor 17 and linear motor 18 are used as the driving means when the lens is being cleaned. With this arrangement, objective 27 is moved also in the radial direction of cleaning member 26. Therefore, that area of cleaning member 26 which contacts objective 27 is widened, thereby making it possible to use substantially all area of cleaning member 26 for cleaning. The cleaning capability of cleaning member 26 can be thus enhanced and the life of cleaning member can be made longer.

Figure 21:
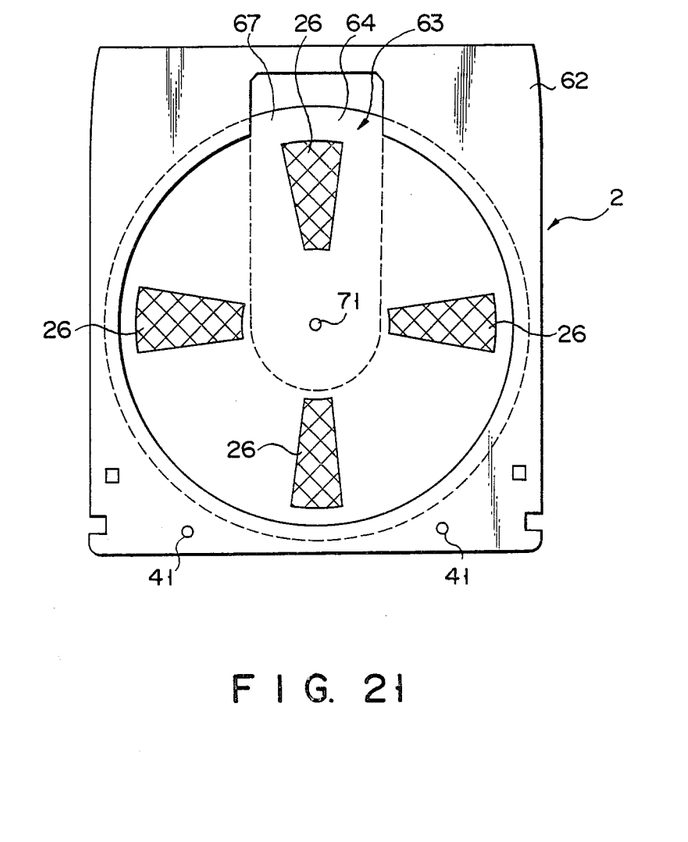
FIG. 21 is a plane view showing another modification of the cleaning cartridge.

Cleaning member 26 is not limited to a ring-shape but it may be located at a part of base 64 in the circumferential direction thereof. Further, as is shown in FIG. 21, a plurality of cleaning members 26 may be provided on base 64 with being spaced from one another in the circumferential direction thereof.

It should be understood that the present invention is not limited to the above-described embodiments and that various changes and modifications can be made within the scope of the present invention.

For example, mechanical sensors such as sensitive lever may be used instead of the optical means such as ID sensors 42 as the means for detecting that cleaning cartridge 2 is loaded in processing apparatus 1. Although the objective of the optical means has been cleaned by the cleaning cartridge in the above-described examples, the present invention may be applied to the cleaning of a cover glass arranged in front of the objective, another cover glass for light-receiving elements, and the like. Further, the material of which the cleaning member is made may be changed according to needs.

What is claimed is:

1. A cleaning cartridge for cleaning optical means movable in first and second directions in a movement path of an information processing apparatus and capable of reproducing information from an optical memory, the cleaning cartridge comprising:
   a cartridge body removably loadable in the processing apparatus and having an opening located in the movement path of the optical means when the cartridge body is loaded in the processing apparatus; and
   cleaning means provided in the cartridge body for contactably cleaning the optical means when the cartridge body is loaded, the cleaning means including a cleaning member and a cleaning unit, said cleaning member being arranged so as to contact the optical means through the opening, said cleaning unit having a support member for supporting the cleaning member, the support member being arranged in the cartridge body so as to move in accordance with the movement of the optical means between an original position where the cleaning means is located in the movement path of the optical means and a swing position where the cleaning means is removed from the movement path of the optical means.

2. A cleaning cartridge according to claim 1, wherein said cleaning member is detachably mounted on the support member.

3. A cleaning cartridge according to claim 1, wherein said cleaning member is ring-shaped and attached to the support member coaxial with the rotational center of the support member.

4. A cleaning cartridge according to claim 1, wherein said cartridge body has a circular opening coaxial with the rotational center of the support member, and said cleaning member is arranged to contact the optical means through the opening.

5. A cleaning cartridge according to claim 1, wherein said cartridge body has stopper means for holding the support member at the original position when the optical means moves in the first direction, and allowing the support member to move from the original position to the swing position when the optical means moves in the second direction.

6. A cleaning cartridge according to claim 5, wherein said cartridge body has a shutter movable between a closed position where the opening is closed by the shutter and an open position where the opening is opened, and said stopper means includes a holding member provided at the shutter for holding the support member at the original position when this shutter is at the closed position.

7. A cleaning cartridge according to claim 5, wherein said cleaning member has a humid portion immersed in a cleaning liquid.

8. A cleaning cartridge according to claim 7, wherein said cleaning member has dry portion, and said humid and dry portions are arranged so that the optical means is first brought into contact with the humid portion and then with the dry portion when the cleaning means is at the original position.

9. An optical information processing apparatus comprising:
   a casing having an inlet opening and a loading section;
   a first cartridge for housing an information recording medium;
   loading means for removably loading the first cartridge in the loading section of the casing;
   optical means movable in a movement path for processing information from the information recording medium of the first cartridge loaded in the loading section;
   a second cartridge removably loadable in the loading section in place of the first cartridge, the second cartridge having cleaning means for contactably cleaning the optical means when the second cartridge is loaded in the loading section;
   means for detecting when the second cartridge is loaded in the loading section; and
   drive means for moving the optical means and the cleaning means relative to each other, and for keeping the optical means and the cleaning means in contact in response to a detection signal supplied from the detecting means.

10. An apparatus according to claim 9, wherein said drive means includes a motor for moving the optical means, and said cleaning means includes a cleaning member located in the movement path of the optical means so that the optical means contacts the cleaning member as the optical means is moved.

11. An apparatus according to claim 9, further comprising means for indicating that the optical means are being cleaned, said indicating means being responsive to a detection signal supplied from the detecting means.

12. An apparatus according to claim 9, wherein said cleaning means is rotatably arranged in the second cartridge, and said drive means has a motor for rotating the information recording medium when the first cartridge is loaded in the loading section and rotating the cleaning means when the second cartridge is loaded in the loading section.

13. An optical information processing apparatus including optical means for reproducing information from an optical memory, the optical information processing apparatus comprising:
   means for cleaning the optical means, the cleaning means including a cartridge body and a cleaning unit provided in the cartridge body, said cleaning unit contacting the optical means;
means for housing the cleaning means;
means for removably loading the cartridge body in the housing means;
means for detecting when the cartridge body is loaded in the loading means; and
means for moving the optical means and the cleaning means relative to each other and for keeping the optical means and the cleaning means in contact in response to a detection signal supplied from the detecting means, so that the optical means is cleaned by the cleaning means.

14. An apparatus according to claim 13, wherein said cleaning means includes a cleaning member and a cleaning unit, said cleaning unit has a support member rotatably arranged in the cartridge body and rotated by the processing apparatus when the cartridge body is loaded therein, and said cleaning member is attached to the support member.

15. An apparatus according to claim 13, wherein said cleaning means is a brush.

* * * * *